(12) United States Patent
Reisdorf et al.

(10) Patent No.: US 8,168,347 B2
(45) Date of Patent: May 1, 2012

(54) SOFC ASSEMBLY JOINT SPACING

(75) Inventors: Gary F. Reisdorf, Penfield, NY (US); Karl J. Haltiner, Jr., Fairport, NY (US)

(73) Assignee: Delphi Technologies Inc., Troy, MI (US)

( * ) Notice: Subject to any disclaimer, the term of this patent is extended or adjusted under 35 U.S.C. 154(b) by 1423 days.

(21) Appl. No.: 11/250,678

(22) Filed: Oct. 14, 2005

(65) Prior Publication Data
US 2006/0147782 A1 Jul. 6, 2006

Related U.S. Application Data

(63) Continuation-in-part of application No. 11/027,095, filed on Dec. 30, 2004, now Pat. No. 7,306,872.

(51) Int. Cl.
*H01M 8/24* (2006.01)
*H01M 8/00* (2006.01)

(52) U.S. Cl. .......... 429/469; 429/400; 429/470

(58) Field of Classification Search .......... 429/34, 429/38
See application file for complete search history.

(56) References Cited

U.S. PATENT DOCUMENTS

| | | | |
|---|---|---|---|
| 3,900,153 A | 8/1975 | Beerwerth et al. | |
| 5,614,127 A | 3/1997 | Khandkar et al. | |
| 5,763,114 A | 6/1998 | Khandkar et al. | |
| 5,795,665 A * | 8/1998 | Allen | 429/12 |
| 6,099,985 A | 8/2000 | Elangovan et al. | |
| 6,268,076 B1 | 7/2001 | Diekmann et al. | |
| 6,558,831 B1 | 5/2003 | Doshi et al. | |
| 6,610,434 B1 | 8/2003 | Draper et al. | |
| 6,656,623 B2 | 12/2003 | Holmes et al. | |
| 6,737,186 B2 | 5/2004 | Janousek et al. | |
| 6,764,784 B2 | 7/2004 | Gillett et al. | |
| 6,770,395 B2 | 8/2004 | Virkar et al. | |
| 6,824,910 B2 | 11/2004 | Chung et al. | |
| 6,835,486 B2 | 12/2004 | Prediger et al. | |
| 6,921,602 B2 | 7/2005 | Diez et al. | |
| 2003/0235746 A1 * | 12/2003 | Haltiner et al. | 429/38 |
| 2004/0060967 A1 * | 4/2004 | Yang et al. | 228/122.1 |
| 2004/0265666 A1 | 12/2004 | Weil et al. | |

FOREIGN PATENT DOCUMENTS

| | | |
|---|---|---|
| EP | 0642185 | 3/1995 |
| EP | 0897897 | 2/1999 |
| EP | 1246283 | 10/2002 |
| EP | 1445814 | 8/2004 |
| EP | 1616657 | 1/2006 |
| JP | 3097234 | 4/1991 |
| WO | WO 90/04490 * | 3/1990 |

OTHER PUBLICATIONS

Search report for EP 06076786. Reisdorf, Gary F, et al., Ceramic Coatings for Insulating Modular Fuel Cell Cassettes in a Solid-Oxide Fuel Cell Stack, U.S. Appl. No. 11/158,369, filed Jun. 22, 2005.
England, Diane M., et al., Hybrid Interconnect for a Solid-Oxide Fuel Cell Stack, U.S. Appl. No. 11/087,904, filed Mar. 23, 2005.
Haltiner, Jr., Karl J., et al., Modular Fuel Cell Cassette for Forming a Solid-Oxide Fuel Cell Stack, U.S. Appl. No. 11/027,095, filed Dec. 30, 2004.

* cited by examiner

*Primary Examiner* — Barbara Gilliam
*Assistant Examiner* — Adam A Arciero
(74) *Attorney, Agent, or Firm* — James M. Chan

(57) ABSTRACT

A textured surface is formed on at least one of a fuel cell mounting plate or fuel cell subassembly to define a joint spacing between these two components. In a preferred embodiment, the textured surface comprises a plurality of dimples coined or otherwise formed in the metal mounting plate. The joint spacing improves the manufacturing and assembly process of the fuel cell cassettes through precise application and control of the brazing process which improves the braze joint strength while reducing material cost.

3 Claims, 2 Drawing Sheets

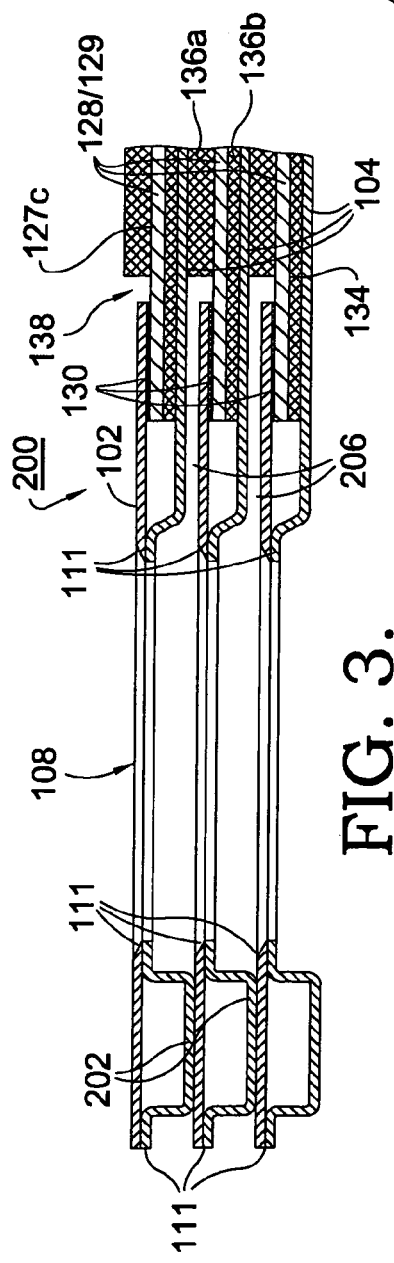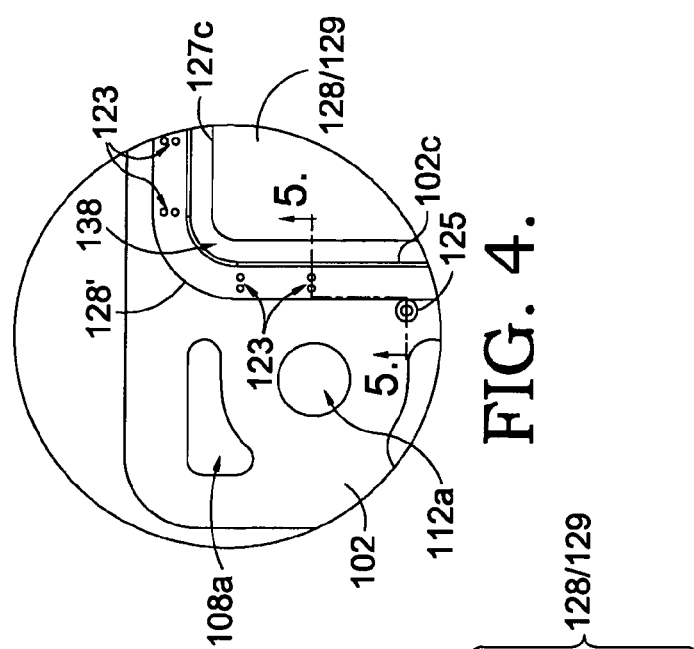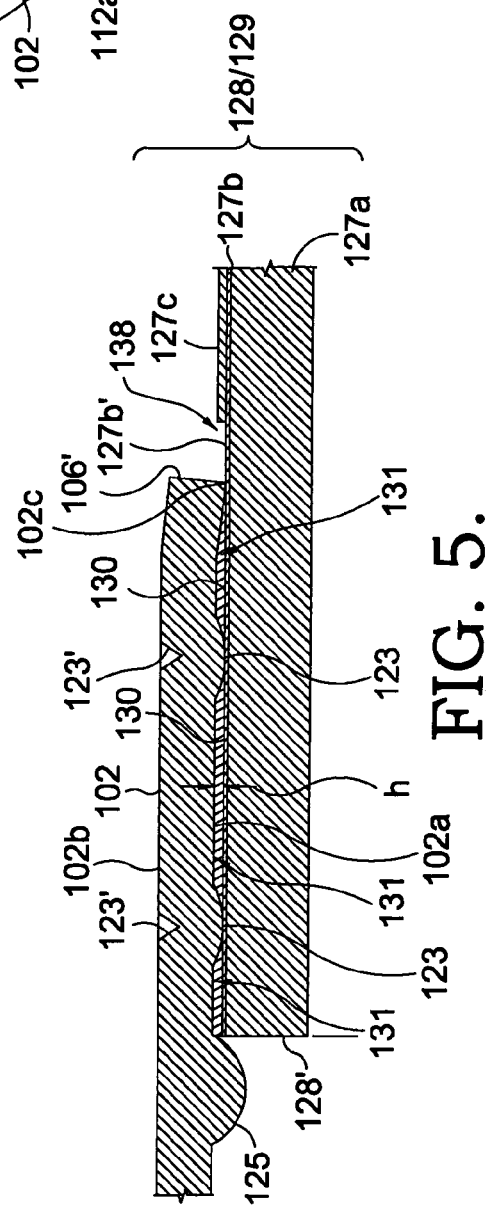

US 8,168,347 B2

SOFC ASSEMBLY JOINT SPACING

RELATIONSHIP TO OTHER APPLICATIONS AND PATENTS

This application is a continuation-in-part of previously filed application Ser. No. 11/027,095 filed Dec. 30, 2004 now U.S. Pat. No. 7,306,872 and entitled "MODULAR FUEL CELL CASSETTE FOR FORMING A SOLID-OXIDE FUEL CELL STACK".

GOVERNMENT STATEMENT

This invention was made with United States Government support under Government Contract/Purchase Order No. DE-FC26-02NT41246. The Government has certain rights in this invention.

TECHNICAL FIELD

The present invention relates to fuel cells; more particularly, to solid-oxide fuel cells; and most particularly, to joint seal formation between components of a fuel cell stack.

BACKGROUND OF THE INVENTION

Fuel cells for combining hydrogen and oxygen to produce electricity are well known. A known class of fuel cells includes a solid-oxide electrolyte layer through which oxygen anions migrate; such fuel cells are referred to in the art as "solid-oxide" fuel cells (SOFCs).

In some applications, for example, as an auxiliary power unit (APU) for an automotive vehicle, an SOFC is preferably fueled by "reformate" gas, which is the effluent from a catalytic liquid hydrocarbon oxidizing reformer, also referred to herein as "fuel gas". Reformate typically includes amounts of carbon monoxide (CO) as fuel in addition to molecular hydrogen. The reforming operation and the fuel cell operation may be considered as first and second oxidative steps of the liquid hydrocarbon, resulting ultimately in water and carbon dioxide. Both reactions are exothermic, and both are preferably carried out at relatively high temperatures, for example, in the range of 700° C. to 1000° C.

A complete fuel cell stack assembly includes fuel cell subassemblies and a plurality of components known in the art as interconnects, which electrically connect the individual fuel cell subassemblies in series. Typically, the interconnects include a conductive foam or weave disposed in the fuel gas and air flow spaces adjacent the anodes and cathodes of the subassemblies.

In the prior art, a fuel cell stack is assembled typically by laying up the interconnects and the fuel cell subassemblies in a jig, forming repetitive fuel cell units. Typically, a fuel cell subassembly comprises a cathode layer coated onto a middle ceramic solid-oxide electrolyte layer which, in turn, is attached to a relatively thick, structurally-significant anode element. In such a prior art assembly, each of the elements in the stack, including the fuel cell subassemblies, becomes a structural and load-bearing element of the stack.

In our commonly assigned, co-pending application Ser. No. 11/027,095, the entire disclosure of which is incorporated herein by reference, a novel modular fuel cell cassette is disclosed wherein a plurality of individually assembled cassettes are assembled into a fuel cell stack. Each cassette basically includes a mounting plate having a main opening wherein the fuel cell subassembly component is mounted, a separator plate and an interconnect. The mounting and separator plates have two sets of registered, alternating openings spaced about their perimeters defining fuel gas and air passages, respectively. The components are sealed at various, strategic locations to create the air-tight and separate channels for proper movement of the fuel gas and air through the anode and cathode spaces, respectively. In this regard, it is understood by those skilled in the art that the fuel gas and air channels should not be allowed to mix. Since each cassette is individually assembled and sealed prior to assembly in the stack, each cassette can be tested for leaks prior to being added to the fuel cell stack, a major improvement over the prior art where leaks were discovered only after full stack assembly.

The assembly, and particularly the sealing, of the fuel cell components presents a unique challenge in that all materials must function, bond and hold a seal at temperatures of 700-800 degrees centigrade. Previously, the fuel cells themselves and the cassettes they are mounted in, were joined and sealed with a glass bonding and sealing system. During sintering, the glass devitrifies and flows to fill the interface between the components to bond and seal them. This seal functioned satisfactorily until the stack is thermal cycled. Due to differences in the coefficient of thermal expansion between components and glass seal, and the fact that the glass progressively crystallizes, the seal fractures resulting in leakage. As the leak progressively increases cell output degrades until the voltage is so low that the output is not usable. In the glass sealing system the space between the surfaces to be bonded and or sealed is maintained by Yttrium Stabilized Zirconium (YSZ) beads.

To overcome the issues experienced with glass, brazing alloys have been developed to bond to the materials and to operate at the necessary temperatures. The issue experienced with braze is if the surfaces are precisely flat and clamped together the braze alloy may be squeezed out of the joint interface. This results in a very weak joint and displaced metal may migrate onto adjacent areas causing a short circuit of the fuel cell or other damage to the cathode. In addition, if the parts are not flat, braze material will be squeezed out of the minimal gap areas. In either situation, the joint is not hermetically sealed resulting in joint leakage and degradation.

Previously, braze space was created by mixing particles of material of 30 to 50 microns into the alloy paste that had a melt temperature greater than 980 degrees C. While the addition of particles for creating braze space was generally functional, it was found that the particles consumed some of the copper oxide (the component of the braze required to bond to ceramic) reducing the effectiveness of the joining system.

There therefore remains a need in the art for creating a joint seal between components of a fuel cell assembly wherein the seal maintains its integrity through all intended manufacturing steps, as well as during the expected usable life of, the fuel cell.

SUMMARY OF THE INVENTION

The present invention addresses the above need by providing a textured surface in the fuel cell frame to create a joint space. Although it is envisioned that various texture configurations and geometries may be employed for this purpose, the presently preferred embodiment comprises dimples of generally circular, convex configuration. A plurality of dimples of the same or dissimilar size may be formed about the perimeter of the fuel cell frame at the location of the seal joint. The arrangement of the dimples may be ordered (e.g., in linear fashion in single or multiple rows) or random. The presently preferred embodiment of the invention comprises forming a double row of dimples spaced around the perimeter of the fuel cell frame. The dimples may be formed (e.g., by coining) in the same tooling at the same time as the blank frame is punched and formed. The preferred dimple height of about 40 microns provides an optimum joint gap. The preferred sealing material is braze and the braze material may be deposited onto either the frame or cell subassembly that is mounted to the frame. When assembled, the dimples act as a hard stop permitting the cell subassembly to be loaded with weight to force conformance of out-of-flat piece parts yet maintain an optimum joint spacing. This braze joint spacing is maintained throughout the entire brazing operation.

The uniform joint spacing provided by the dimples provide a number of advantages. For example, the precise amount of braze required to fill the spacing is easily quantifiable and may be dispensed in a uniform manner. This allows for a highly repeatable and robust automated assembly process, thereby reducing manufacturing costs. Material cost is even further reduce since there is no "squeezing out" of the braze which occurred in the prior art process. Also, the past problem of beads consuming some of the copper oxide is eliminated. Furthermore, since the dimples act as a hard stop, cell stack load forces will not reduce or eliminate the joint spacing as sometimes occurred in the prior art. In yet a further embodiment of the invention, a lip is formed in the mounting plate edge to prevent the braze from leaking onto the cathode surface which could cause a short circuit.

BRIEF DESCRIPTION OF THE DRAWINGS

The present invention will now be described, by way of example, with reference to the accompanying drawings, in which:

FIG. 3 is an enlarged cross sectional view as taken along the line 3-3 in FIG. 2;

FIG. 4 is a fragmented, enlarged view of the circular section labeled 4 in FIG. 1; and FIG. 5 is an enlarged, cross-sectional view of the fuel cassette as taken generally along the line 5-5 in FIG. 4.

DESCRIPTION OF THE PREFERRED EMBODIMENTS

Figure 1:
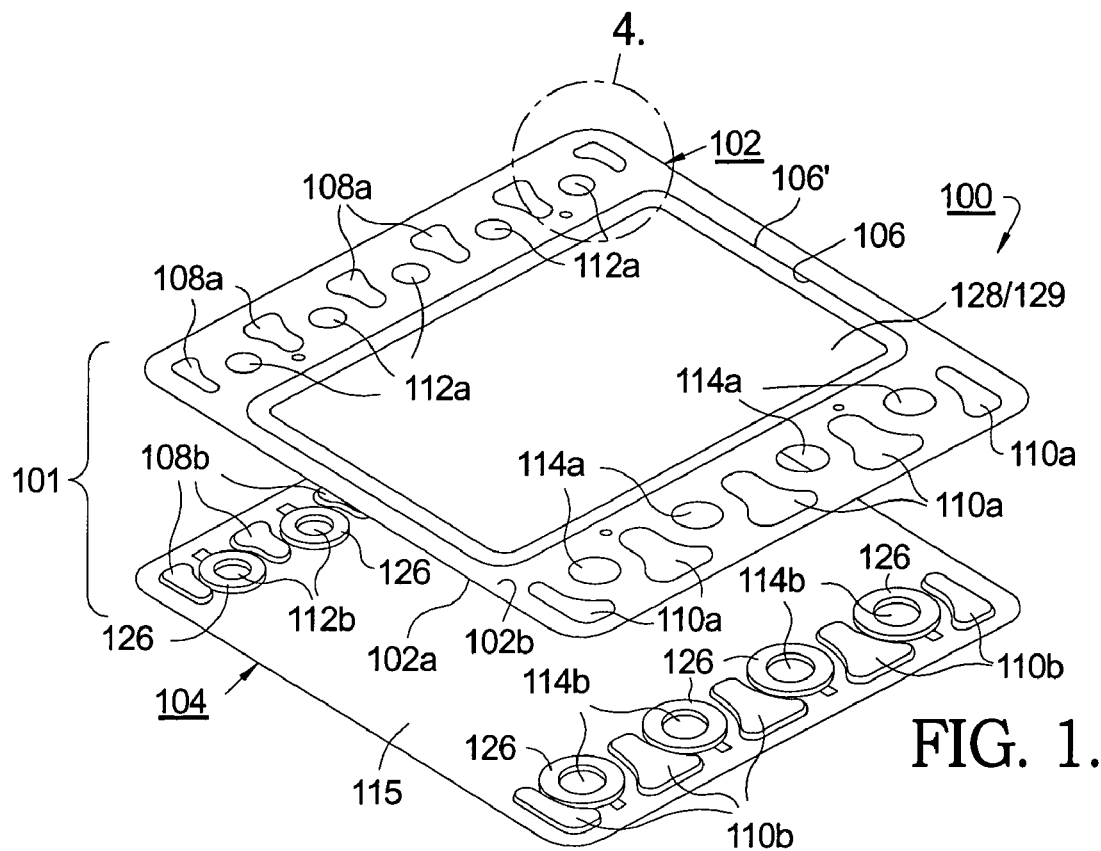
FIG. 1 is an exploded isometric view of a fuel cell cassette in accordance with an embodiment of the invention.

Referring to FIG. 1, a fuel cell cassette 100 in accordance with an embodiment of the invention includes a cassette housing 101 including a fuel cell mounting plate 102 and a separator plate 104. Mounting plate 102 includes a large central electrode opening 106 for receiving a fuel cell subassembly 128 as described below. Outboard of central electrode opening 106 are cathode air inlets 108a, cathode air outlets 110a, fuel gas inlets 112a and fuel gas outlets 114a. Separator plate 104 is provided with similar and mating air and fuel openings 108b, 110b, 112b, and 114b, respectively. Separator plate 104 is formed as a shallow tray 115 such that a cavity is created between plates 102, 104 for receiving fuel cell components and fuel gas as described below. Preferably, the mounting and separator plates are formed as by stamping or drawing from thin sheet stock (about 0.1 to 1.0 mm) of a ferretic stainless steel, such as Crofer 22, although other materials such as austenitic stainless steel or high temperature alloys may also be acceptable. During assembly, plates 102, 104 are joined to define a cassette housing 101 by formation of a metallurgical bond 111 at their edges and around each of the air inlets 108a and air outlets 114a such that only openings 112a,b and 114a,b have access to the interior of the cassette 101 (see FIG. 3).

Fuel cell subassembly 128 is a three-layer structure comprising a structural anode 127a, a ceramic electrolyte 127b, and a cathode 127c. The anode 127a and cathode 127c are also referred to herein collectively as electrodes 129. Such a fuel cell subassembly is well known in the art of solid oxide fuel cells.

To connect fuel cell subassembly 128 to mounting plate 102, the cathode material 127c is stripped or omitted (such as by screen printing) to reveal a surface 127b' of the electrolyte layer 127b of subassembly 128 extending adjacent to outer peripheral edge 128' thereof (FIG. 5). Electrolyte surface 127b' is then thermally bonded to surface 102a of mounting plate 102 via a bonding seal 130. In the preferred embodiment, bonding seal 130 is formed by brazing, although other connecting methods and materials may be employed such as, for example, glass or a ceramic adhesive seal. A preferred braze alloy used with the present invention is reactive air braze developed by PNNL/Battele and which is the subject of International Patent Publication WO 03/059843. This braze alloy is capable of bonding ceramics (including YSZ) to the oxide layer formed on many metals at elevated temperature. In addition, the brazing operation for this alloy is best done in an atmospheric furnace environment. Silver brazing alloys are known for withstanding vibration without work hardening and are capable of yielding without fracture at elevated temperatures. The melt temperature of this alloy has been tested and determined to be liquidous at 960 Deg. Centigrade. This is very close to the melt temperature of silver at 963 Deg. C. Thus, it will be functional in the fuel cell running at 750 Deg. C. These alloys bond with structural integrity and provide a hermetic seal and function to separate fuel and air. For all of these reasons, this alloy (or other potential braze alloys) is well suited for joining fuel cell components.

Thus, subassembly 128 is oriented such that the cathode surface 127c is exposed through central opening 106 with anode surface 127a facing inwardly of the cassette housing 101 (toward separator plate 104). Furthermore, a gap 138 is defined between cathode surface 127c and mounting plate 102 such that cathode surface 127c is electrically insulated from mounting plate 102. To facilitate correct assembly of the fuel cell subassembly 128 to the mounting plate 102 with proper spacing of the gap 138, a plurality of protrusions 125 may be formed in spaced relation about the perimeter of mounting plate surface 102b. When attaching the fuel cell subassembly 128 to mounting plate 102, the outer peripheral edge 128' of the electrolyte layer 127b is placed in abutting relation to the protrusions 125 (FIG. 5) which thereby properly locates the subassembly 128 with respect to the mounting plate 102.

Figure 2:
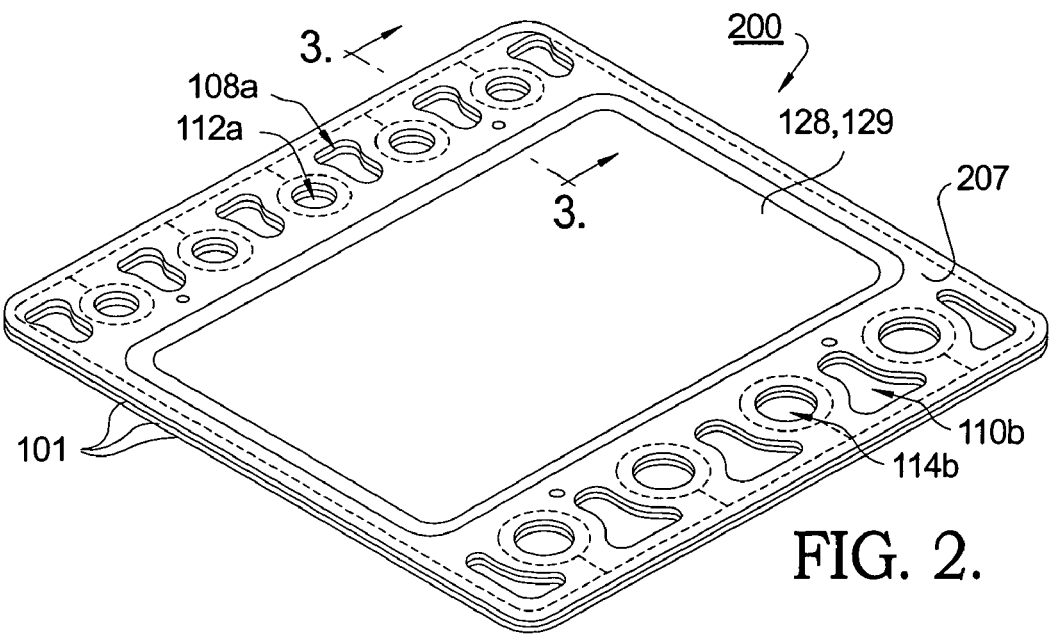
FIG. 2 is an isometric view of a fuel cell stack comprising three cassettes in accordance with an embodiment of the invention.

Referring to FIGS. 2 and 3, three such cassettes 101 are shown in stacked relation to form a fuel cell in a manner known to those skilled in the art. Although only three cassettes are shown, it is understood that many more cassettes may be placed in stacked relation to form a single operating fuel cell where fuel gas enters through inlet 112a,112b, passes through into the anode gas channel (space contained within the cassette), and into the fuel gas outlets 114 from the anode gas channel. The folded rings 126 (FIG. 1) form solid metal spacers between mounting plate 102 and separator plate 104, thus defining and maintaining a constant spacing therebetween despite assembly and operational loads on the cassette. Preferably, rings 126 are formed by stamping from sheet materials similar to those disclosed for forming the mounting plate and separator plate.

Referring to FIG. 3, the spaces adjacent to cathode surface 132 and anode surface 134 serve two distinct functions: to allow passage of the appropriate reactive gases along the electrode surfaces, and to transmit electric current to and from the cell in known fashion. Each such space is filled with a conductive interconnect 136 that is porous or has passages formed into it to allow gas flow. Alternatively, an interconnect may have features formed into it, such as dimples or ribs, to make electrical contact. In a currently preferred embodiment, a metal mesh or foam interconnect 136 (cathode interconnect 136a and anode interconnect 136b) permits passage of gases along the electrodes and conducts current into and out of the cassette. Because of the corrosive nature of wet reformate on ferritic stainless steels at high temperatures, preferred materials for the interconnects are nickel mesh, a super-ferritic alloy such as Crofer 22 APU or a nickel-based superalloy such as Haynes 230 alloy. Note that cathode interconnect 136a is separated by gap 138 from contact with mounting plate 102.

To complete the assembly of an individual cassette 100, rings 126 are positioned over anode inlet and exhaust openings 112b,114b as shown in FIG. 1, interconnect 136b is positioned on separator plate 104, and mounting plate 102 bearing fuel cell element 128 is aligned with and placed over separator plate 104.

The two plates 102,104 are then metallurgically joined as by welding or brazing to form joints 111 as described above. The edges of the "keyhole" shaped cathode inlet and exhaust openings 108,110 are formed similar to the perimeter of the cassette so that those edges are also laser welded together. This prevents cathode air from entering the anode gas channel (interior of the cassette), or anode gas leaking into the cathode air chimney/manifold.

Within the scope of the invention, the fuel cell subassembly may be oriented with either the cathode surface or the anode surface exposed through opening 106 in mounting plate 102. However, the currently preferred assembly configuration has the anode fuel gas stream and fuel cell subassembly 128 contained within the cassette, as shown in FIG. 3. With this approach, the metallurgical bond joint 111 at the perimeter edges of the cassette and the seal 130 between the fuel cell element and the mounting plate are the critical sealing joints for containing the combustible fuel gas within the cassette and stack, which can be leak tested at room temperature before final assembly of the fuel cell stack. This approach significantly improves the quality of the stack manufacturing process and reliability of the stack assembly.

The present invention improves the seal joints of a solid oxide fuel cell in the following manner. As seen best in FIGS. 4 and 5, mounting plate surface 102a is provided with a textured surface to create a joint spacing 131 between the facing surfaces 102a and 127b'. The textured surface may be any type or configuration of protrusion from the surface that creates a spacing between facing surfaces of the joint to be sealed. In the preferred embodiment, the textured surface is in the form of a plurality of convex protrusions or "dimples" 123. Dimples 123 are placed in spaced relation about and adjacent to the peripheral edge 106' of central electrode opening 106 thereof. When fuel cell subassembly 128 is attached to mounting plate 102 as described above, dimples 123 act as a stop to create a joint spacing 131 between facing surfaces 102a and 127b' of mounting plate 102 and electrolyte layer 127b, respectively. Joint spacing 131 allows braze material to occupy this space and create a very strong joint. Besides creating a much stronger braze joint than was previously achieved, the advantages of creating a defined joint spacing 131 include, for example, prevention of squeezing out of braze material upon application of a load to the assembled mounting pate and fuel cell subassembly; a reduction in material costs due to less waste (the amount of braze required is now precisely determinable); and a reduction in manufacturing costs due to a reduction in additional steps previously required to remove squeezed-out braze. Although the exact number and placement of the dimples 123 may vary according to the desires of the user, in the preferred embodiment, a double row of dimples 123 are formed in spaced relation about and adjacent the perimeter of edge 106a as seen in FIG. 4. This ensures a proper joint spacing 131 is created about the full perimeter of opening 106. In the preferred embodiment, the dimples 123 are formed of a size that creates a joint spacing 131 having a height "h" of between about 30 to 50 microns, and more preferably about 40 microns, although this may vary depending on the type of braze or other bonding material used.

Although the invention has been shown and described with reference to a specific joint seal 130, it is understood that the invention may be employed at any joint location such as, for example, joint seal 111. It is also understood that the dimples may be formed on either or both of the facing joint surfaces. The manner of forming the dimples may also vary although it would be advantageous to form the dimples at the same time the mounting plate 102 itself is formed. Appropriate tooling may be used to coin the dimples as evidenced by notches 123' formed opposite dimples 123 in mounting plate surface 102b (FIG. 5). It is further understood that the configuration and size of the dimples may vary and the invention is not limited to the convex configuration described and shown herein.

As discussed above, one of the problems with the prior art method of joint sealing was that the braze or sealing material often escaped from the joint seal (e.g. by being squeezed out under load or by wicking) and deposited onto the surface of the electrolyte layer. If the braze or seal material makes contact with the cathode layer, a short circuit could result, thereby adversely affecting the operation of the fuel cell. To prevent this problem, a lip 102c is formed in the mounting plate edge 106' extending in the same direction as dimples 123. Referring again to FIG. 5, it will be seen that the joint spacing 131 is effectively sealed off where the lip 102c contacts electrolyte surface 127b'. This prevents braze material from wicking or otherwise escaping from the joint spacing 131 and migrating into the gap 138.

While the invention has been described by reference to various specific embodiments, it should be understood that numerous changes may be made within the spirit and scope of the inventive concepts described. Accordingly, it is intended that the invention not be limited to the described embodiments, but will have the full scope defined by the language of the following claims.

What is claimed is:

1. A mounting plate having a surface for attachment of a fuel cell subassembly thereto, at least one of said mounting plate surface and said fuel cell subassembly having at least one textured feature, said at least one textured feature having a predesignated size defining a joint spacing between said mounting plate surface and said fuel cell subassembly when said at least one textured feature is placed in contacting, facing relationship to said fuel cell subassembly and/or said mounting plate, wherein a joint seal is disposed within said joint spacing for joining said mounting plate and said fuel cell subassembly, and wherein an amount of said joint seal disposed within said joint spacing is predetermined in part by said predesignated size of said at least one textured feature;

wherein said mounting plate includes a central opening defined by an edge and wherein said fuel cell subassembly is positioned, said mounting plate surface extending about the entire edge of said central opening;

wherein said fuel cell subassembly includes an electrolyte layer having an outer peripheral edge and a cathode peripheral edge spaced inwardly of said outer peripheral edge and thereby exposing a surface of said electrolyte layer, said electrolyte layer surface attached to said mounting plate surface and defining a gap between said mounting plate central opening edge and said cathode peripheral edge wherein said edge of said mounting plate central opening forms a lip and contacts said fuel cell subassembly to define the limit of said gap, and thereby closing said joint spacing at the point of said contact.

2. The mounting plate of claim 1 further comprising at least one protrusion formed on said mounting plate surface, wherein said fuel cell subassembly includes an electrolyte layer having an outer peripheral edge configured to be placed in abutting relation with said at least one protrusion.

3. A mounting plate having a surface for attachment of a fuel cell subassembly thereto, at least one of said mounting plate surface having a textured surface defining a joint spacing between said mounting plate surface and said fuel cell subassembly when said textured surface is placed in contacting, facing relationship to said fuel cell subassembly, wherein a joint seal is disposed within said joint spacing for joining said mounting plate and said fuel cell subassembly, wherein said mounting plate includes a central opening defined by an edge and wherein said fuel cell subassembly is positioned, said mounting plate surface extending about the entire edge of said central opening, wherein said fuel cell subassembly includes an electrolyte layer having an outer peripheral edge and a cathode peripheral edge, said cathode peripheral edge spaced inwardly of said outer peripheral edge and thereby exposing a surface of said electrolyte layer, said electrolyte layer surface attached to said mounting plate surface and defining a gap between said mounting plate central opening edge and said cathode peripheral edge, and wherein said edge of said mounting plate central opening forms a lip and contacts said fuel cell subassembly to define the limit of said gap, and thereby closing said joint spacing at the point of said contact.

* * * * *